US006986001B2

(12) United States Patent
Zhang

(10) Patent No.: US 6,986,001 B2
(45) Date of Patent: Jan. 10, 2006

(54) SYSTEM AND METHOD FOR HIERARCHICAL APPROXIMATION OF LEAST RECENTLY USED REPLACEMENT ALGORITHMS WITHIN A CACHE ORGANIZED AS TWO OR MORE SUPER-WAYS OF MEMORY BLOCKS

(75) Inventor: David X. Zhang, San Jose, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 226 days.

(21) Appl. No.: 10/274,766

(22) Filed: Oct. 21, 2002

(65) Prior Publication Data

US 2004/0078526 A1  Apr. 22, 2004

(51) Int. Cl.
*G06F 12/00* (2006.01)
(52) U.S. Cl. .................. 711/133; 711/113; 711/128; 711/130; 711/134; 711/135; 711/136
(58) Field of Classification Search .................. 463/45, 463/29, 35, 16, 20; 711/133–134, 136, 128, 711/125–126, 118–123
See application file for complete search history.

(56) References Cited

U.S. PATENT DOCUMENTS

| 5,325,504 A | * | 6/1994 | Tipley et al. ............... 711/128 |
| 5,509,135 A | * | 4/1996 | Steely, Jr. ................... 711/147 |
| 5,568,632 A | * | 10/1996 | Nelson ....................... 711/133 |
| 5,900,011 A | * | 5/1999 | Saulsbury et al. .......... 711/119 |
| 6,594,728 B1 | * | 7/2003 | Yeager ........................ 711/127 |
| 2003/0084247 A1 | * | 5/2003 | Song et al. .................. 711/128 |

OTHER PUBLICATIONS

Sherwood et al., Jun. 30-Jul 4, 2001, pp. 86-97.*

\* cited by examiner

*Primary Examiner*—Donald Sparks
*Assistant Examiner*—Hashem Farrokh
(74) *Attorney, Agent, or Firm*—Schwegman, Lundberg, Woessner & Kluth, P.A.

(57) ABSTRACT

A system for approximating a least recently used (LRU) algorithm for memory replacement in a cache memory. In one system example, the cache memory comprises memory blocks allocated into sets of N memory blocks. The N memory blocks are allocated as M super-ways of N/M memory blocks where N is greater than M. An index identifies the set of N memory blocks. A super-way hit/replacement tracking state machine tracks hits and replacements to each super-way and maintains state corresponding to an order of hits and replacements for each super-way where the super-ways are ordered from the MRU to the LRU. Storage for the state bits is associated with each index entry where the state bits include code bits associated with a memory block to be replaced within a LRU super-way. LRU logic is coupled to the super-way hit/replacement tracking state machine to select an LRU super-way as a function of the super-way hit and replacement history. Block selection logic then selects a memory block to be replaced within the LRU super-way as a function of predefined selection criteria.

10 Claims, 7 Drawing Sheets

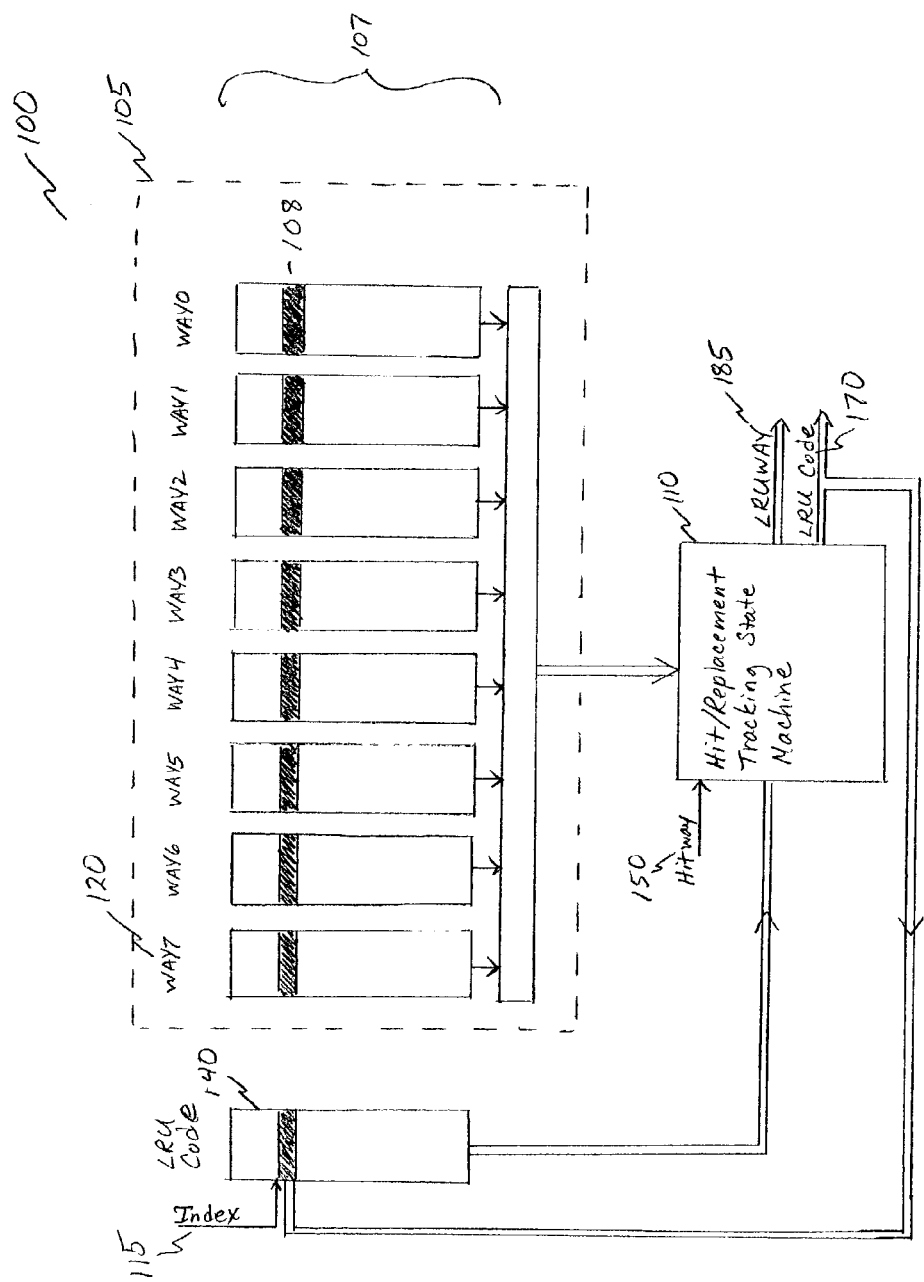
Figure 1. Cache Memory System with Hit/Replacement Tracking State Machine.

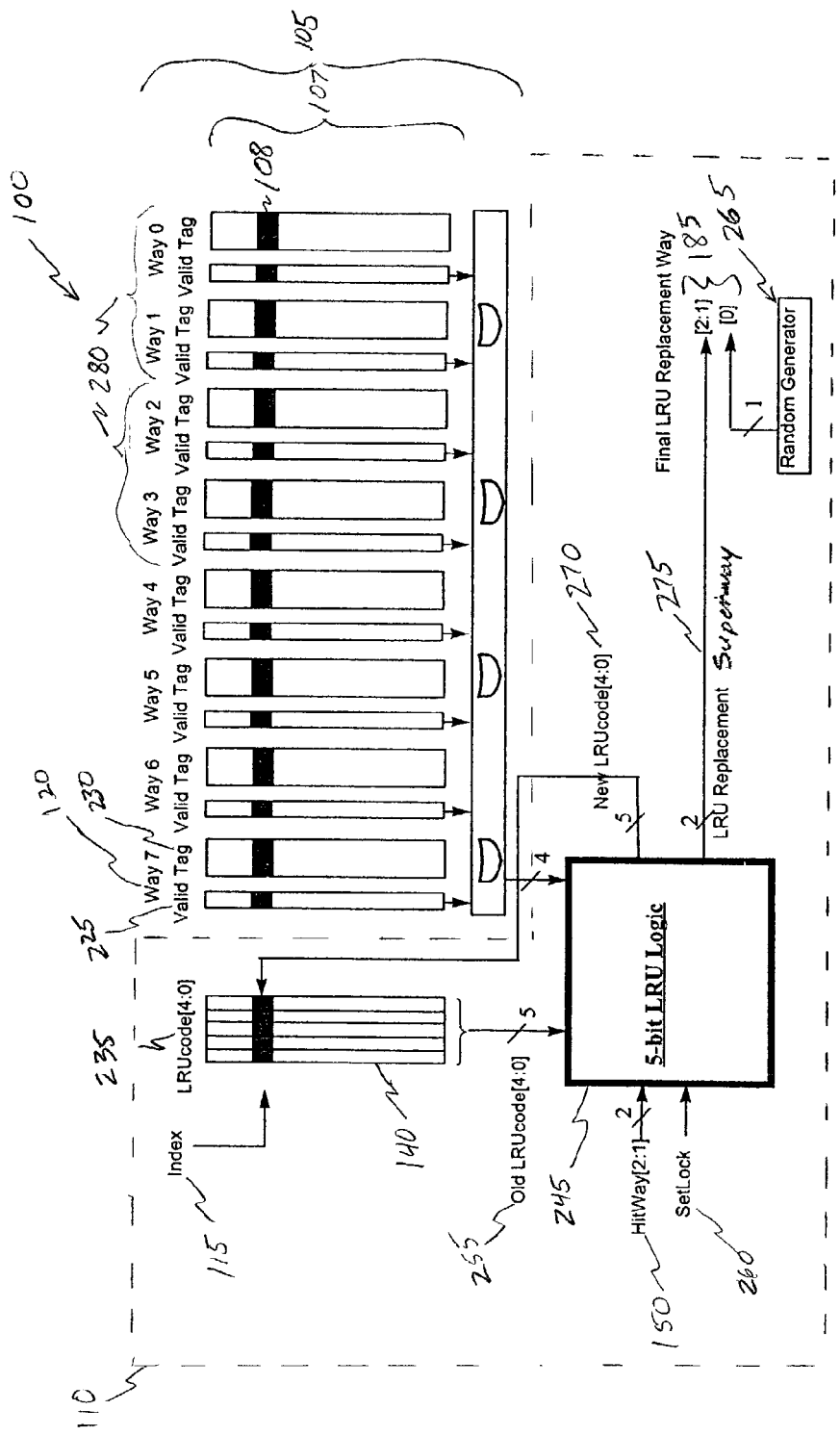
Figure 2. 8-way set associative cache memory with a 5-bit LRU algorithm.

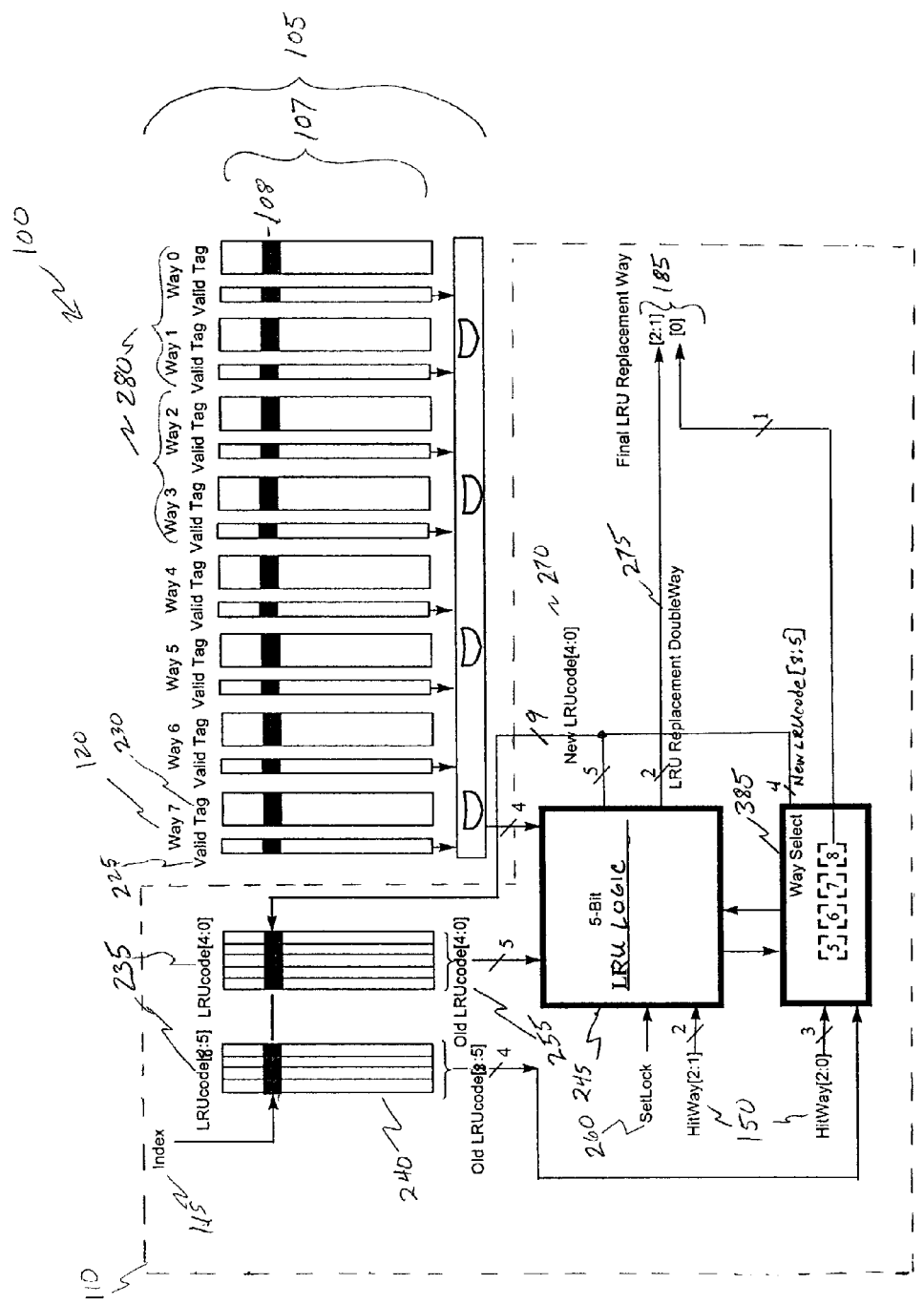
Figure 3. 8-way set associative cache memory with a 9-bit LRU algorithm.

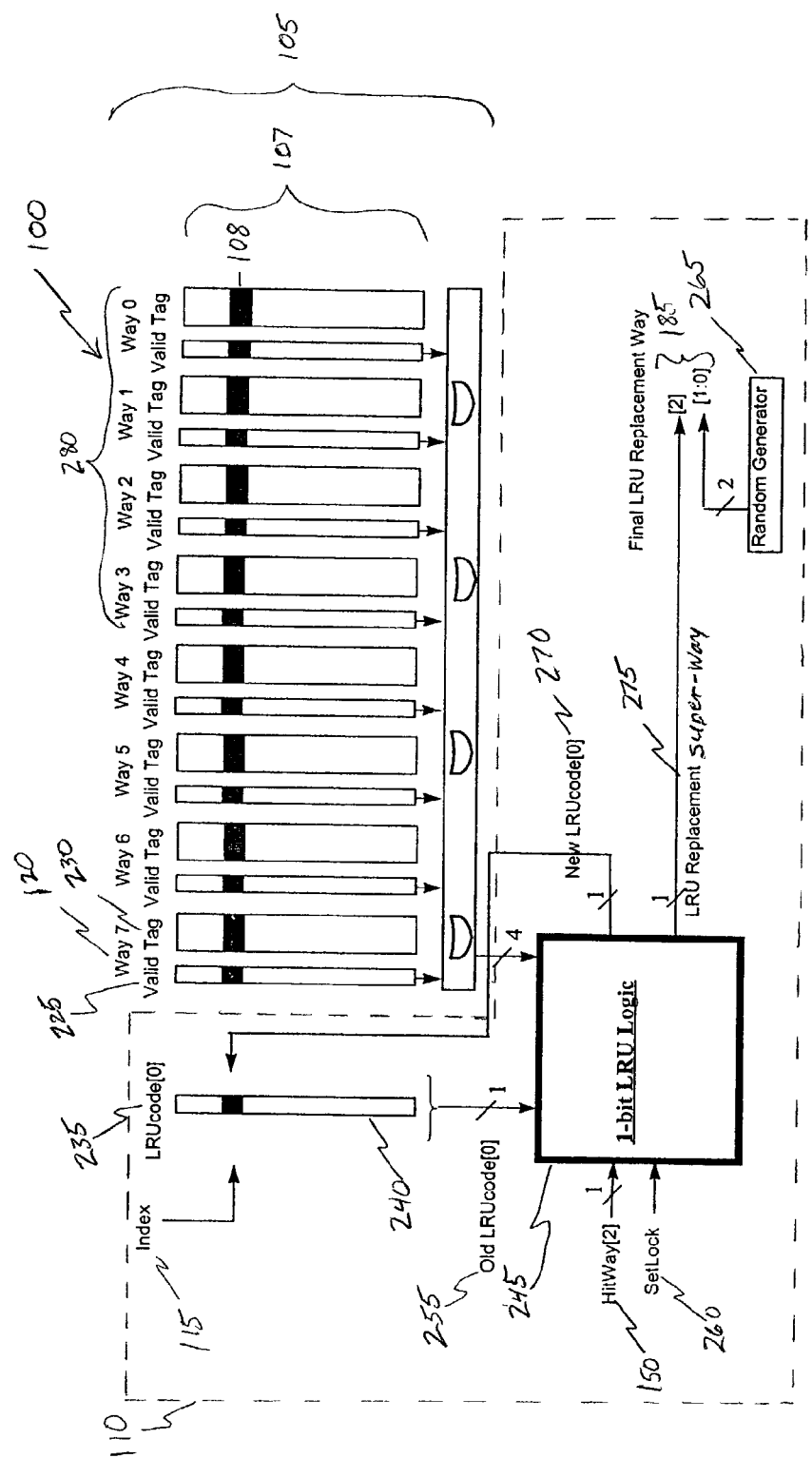
Figure 4. 8-way set associative cache memory with a 1-bit LRU algorithm.

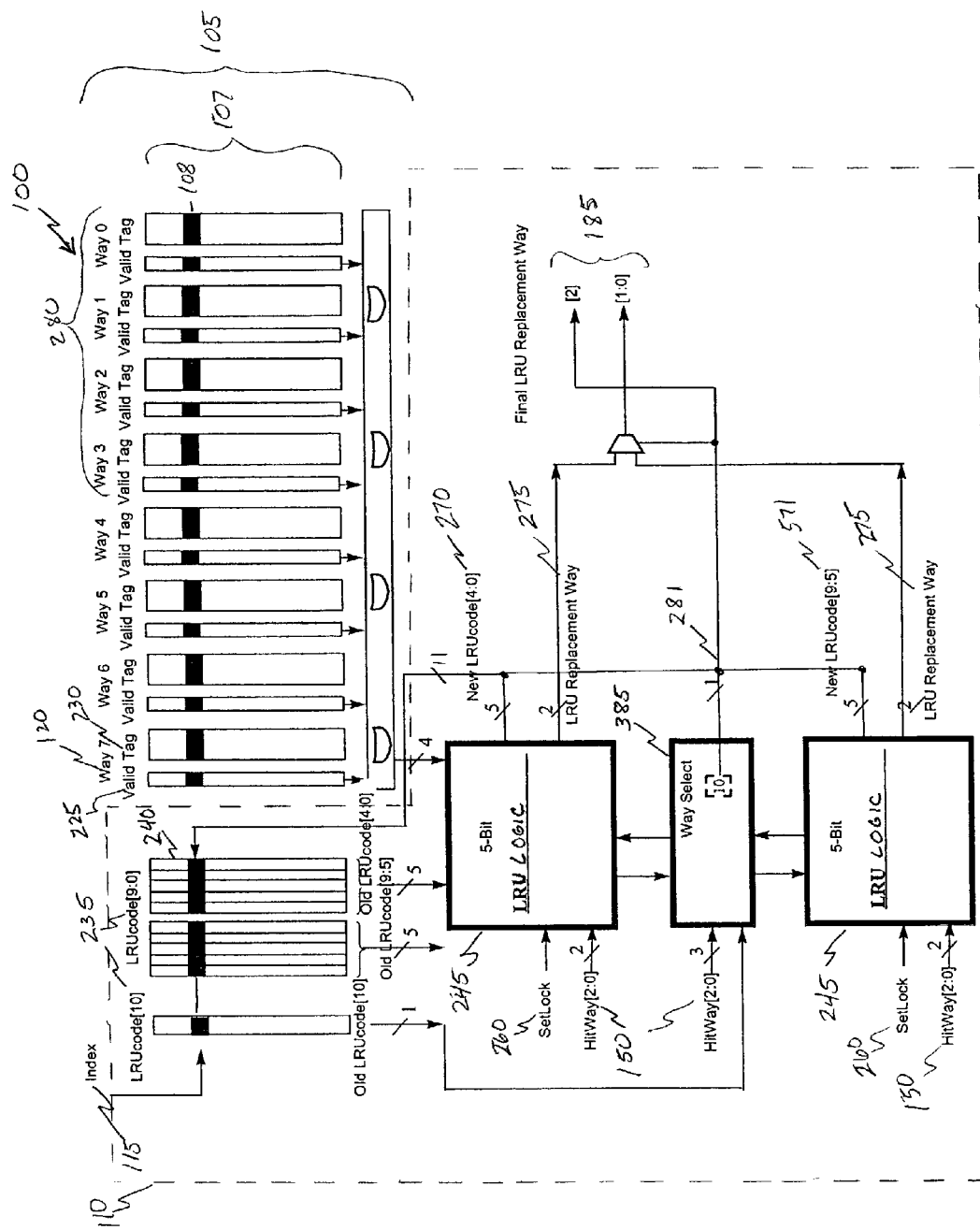
Figure 5. 8-way set associative cache memory with an 11-bit LRU algorithm.

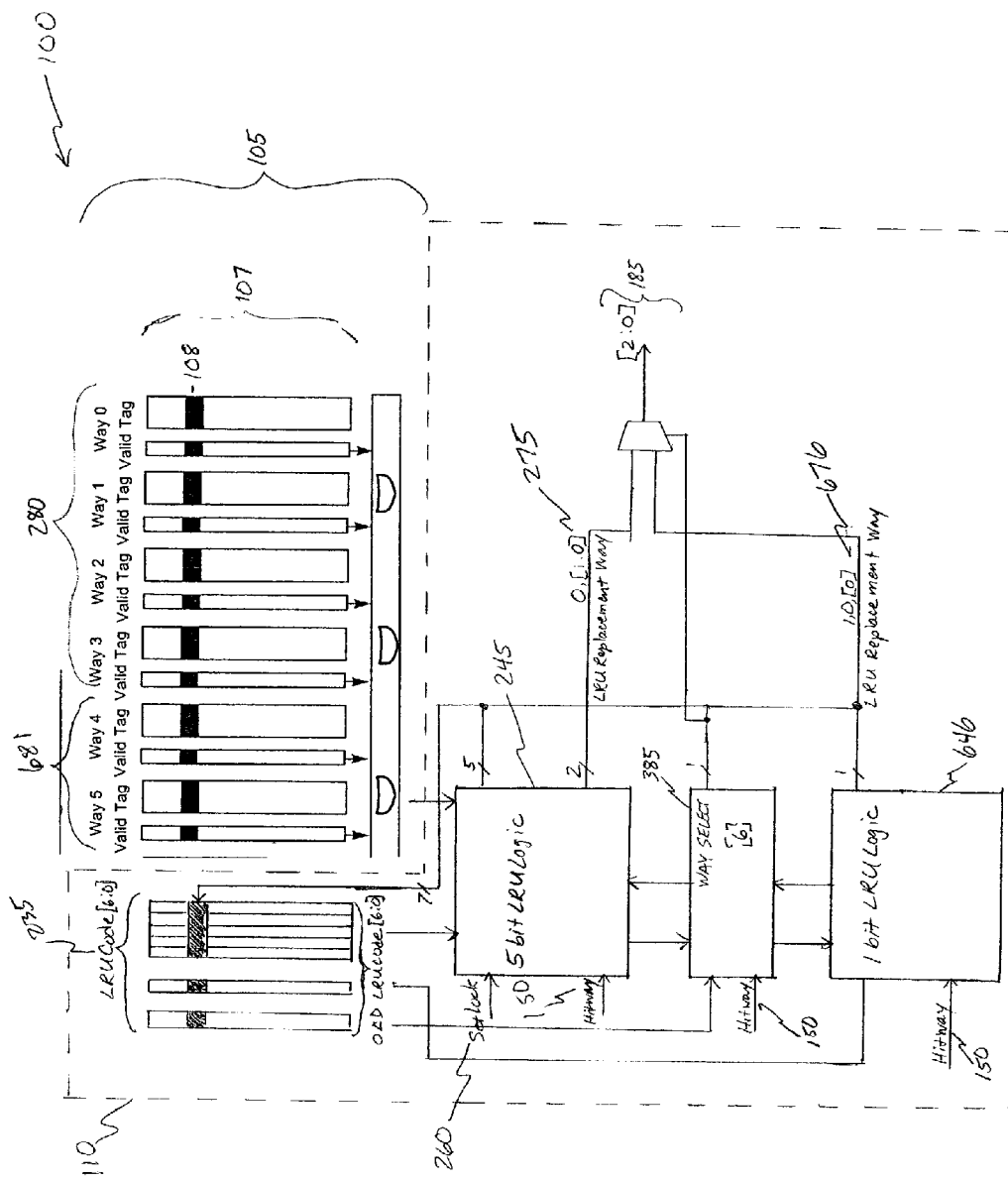
Figure 6. 6-way set associative cache memory with a 7-bit LRU algorithm

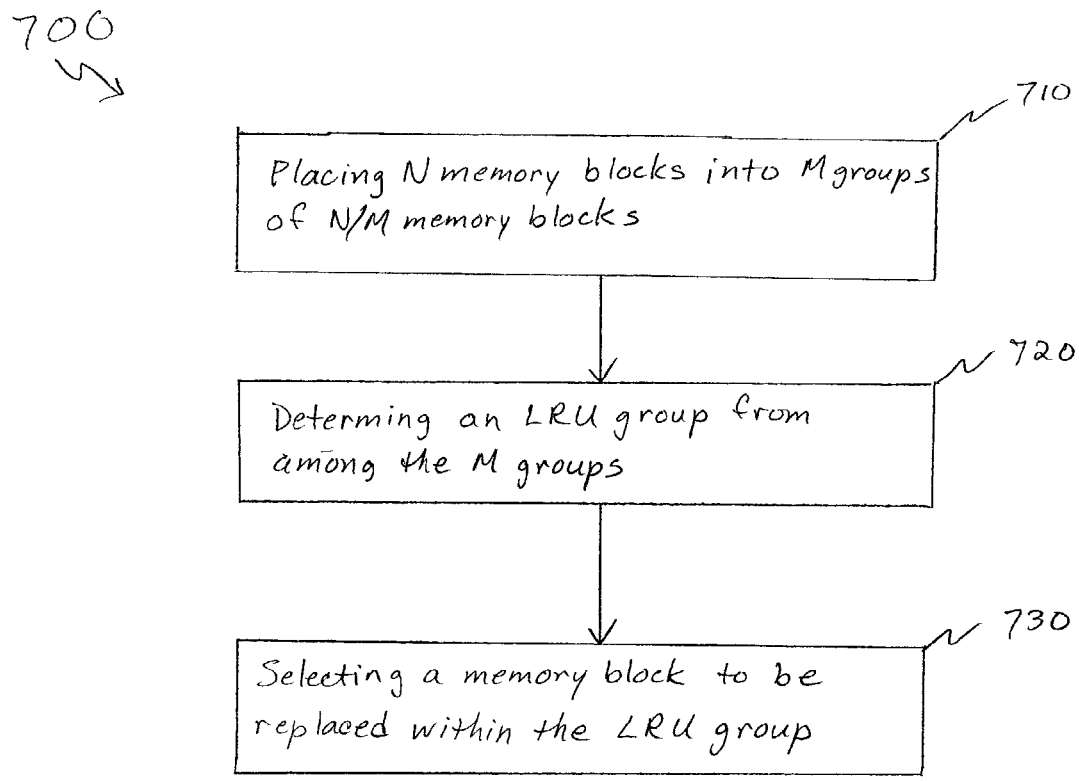
Figure 7. A method of selecting a memory block to be replaced on a cache miss.

US 6,986,001 B2

SYSTEM AND METHOD FOR HIERARCHICAL APPROXIMATION OF LEAST RECENTLY USED REPLACEMENT ALGORITHMS WITHIN A CACHE ORGANIZED AS TWO OR MORE SUPER-WAYS OF MEMORY BLOCKS

TECHNICAL FIELD

This document relates to memory technology, and, in particular, to a system and method for replacing the Least Recently Used (LRU) memory block in a cache memory.

BACKGROUND

In computer systems it is important to minimize the time necessary for processors to access data. Main memory is typically slow and located many machine cycles away from the processors. To solve this problem, computer systems generally utilize a memory hierarchy in which smaller and faster memories are located close to processors. Cache memories are smaller, faster memories that contain a copy of main memory data used more often by the processors. Data in a cache memory is stored in memory blocks that contain both the data and a tag that identifies the data. If the desired data is not located in cache memory, a cache miss occurs and the data must be fetched from main memory. If the fetched data can only be written into one memory block in the cache, the cache is said to be direct mapped. To reduce the miss rate, cache memories are sometimes associative so that a memory block can be written anywhere in the physical cache memory. As the cache size and the amount of associativity increases, the amount of circuitry necessary to manage the data in the cache increases. A compromise between a direct mapped cache and a fully associative cache is a set associative cache. In a set associative cache data may be written into more than one of the available memory blocks, but not into all available memory blocks. It is important to choose the algorithm used to replace memory blocks within the cache such that the cache miss rate is low yet the amount of cache management circuitry does not become too expensive in terms of development time and, ultimately, silicon area. What is needed is a system and method that uses an efficient cache replacement algorithm that has a low miss rate, and in general uses a low amount of circuitry to implement the algorithm.

SUMMARY

This document discusses systems and methods for replacing blocks of memory in a cache memory organized as two or more super-ways of memory blocks. In one system example, the cache memory comprises memory blocks allocated into sets of N memory blocks. The N memory blocks are allocated as M super-ways of N/M memory blocks, where N and M are both integers and N is greater than M. An index identifies the set of N memory blocks. A super-way hit/replacement tracking state machine tracks hits and replacements to each super-way and maintains state corresponding to an order of hits and replacements for each super-way where the super-ways are ordered from the MRU to the LRU. Storage for the state bits is associated with each index entry where the state bits include code bits associated with a memory block to be replaced within a LRU super-way. LRU logic is coupled to the super-way hit/replacement tracking state machine to select an LRU super-way as a function of the super-way hit and replacement history. Block selection logic then selects a memory block to be replaced within the LRU super-way as a function of predefined selection criteria.

One method example places the N memory blocks of a cache memory into M groups of N/M blocks and determines which of the M groups of blocks is the LRU group. Determining the LRU group of memory blocks includes ordering the M groups of memory blocks from a most recently used (MRU) group to the LRU group, wherein ordering the groups includes tracking, via a state machine, an order of hits and replacements to each group such that a state of the state machine corresponds to an order of hits. A memory block within the LRU group is then selected for replacement by randomly selecting the block. In another method example, a block is selected for replacement using the history of memory block replacement in the LRU group.

Thus the systems and methods described reduce the amount of complexity needed to manage the cache memory in exchange for a reasonable probability that the actual LRU memory block is replaced.

This summary is intended to provide an overview of the subject matter of the present patent application. It is not intended to provide an exclusive or exhaustive explanation of the invention. The detailed description is included to provide further information about the subject matter of the present patent application.

BRIEF DESCRIPTION OF THE DRAWINGS

In the drawings, where like numerals refer to like components throughout the several views, FIG. 1 shows a block diagram of one embodiment of a cache memory with a hit-tracking state-machine.

FIG. 2 shows a block diagram of one embodiment of an eight-way set associative cache memory with an LRU algorithm that uses five-bits.

FIG. 3 shows a block diagram of one embodiment of an eight-way set associative cache memory with an LRU algorithm that uses nine-bits.

FIG. 4 shows a block diagram of one embodiment of an eight-way set associative cache memory with an LRU algorithm that uses one-bit.

FIG. 5 shows a block diagram of one embodiment of an eight-way set associative cache memory with an LRU algorithm that uses eleven-bits.

FIG. 6 shows a block diagram of one embodiment of a six-way set associative cache memory with an LRU algorithm that uses seven-bits.

FIG. 7 shows a flow chart of a method of selecting a memory block to be replaced in the event of a cache miss.

DETAILED DESCRIPTION

In the following detailed description, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

FIG. 1 shows one embodiment of a cache memory system 100 with a hit/replacement tracking state-machine 110. The cache memory 105 is comprised of memory blocks 107 that are allocated into sets 108. Each set 108 is accessed using an index 115. Each set 108 is allocated into ways 120. In the embodiment shown, the sets 108 are allocated into eight ways 120. The hit/replacement tracking state machine 110 tracks the ways 120 containing cache hits 150 and cache replacements to generate a Least Recently Used (LRU) code 170. The LRU code 170 is generated for each set 108 of memory blocks. The LRU code 170 is stored in LRU code storage buffer 140. In the event of a cache miss, LRU code 170 is decoded to identify a way 185,120 to be replaced. Table 1 shows the number of bits required for an LRU code based on the number of ways 120.

TABLE 1

Number of LRU Code bits required.

| | No. of Ways | | | | | | | |
|---|---|---|---|---|---|---|---|---|
| | 2 | 3 | 4 | 5 | 6 | 7 | 8 | n |
| No. of LRU States | 2 | 6 | 24 | 120 | 720 | 5040 | 40320 | n! |
| Min No. of Code Bits | 1 | 3 | 5 | 7 | 10 | 13 | 16 | $x = \lceil \log_2(n!) \rceil$ |

FIG. 2 shows one embodiment of an eight-way set associative cache memory system 100 that uses a five-bit LRU algorithm to implement the hit-tracking state machine 110. As in FIG. 1, the memory blocks 107 of the cache memory 105 are divided into sets 108 of memory blocks 107 and the sets 108 are accessed using an index 115. The sets 108 are further allocated into ways 120. Each way 120 includes a valid bit 225 and a tag 230 for each set 108. The valid bit 225 flags the data in the way 120 as valid and the tag 230 identifies the data stored in the memory block 107. Each set 108 has an LRU code 235 stored in a code memory array 140. The LRU code 235 is used to order the ways from the Most Recently Used (MRU) to the LRU. For example, if there are four ways, the LRU code 235 will identify which way is the MRU, the MRU-1 (nearest the MRU), LRU-1 (nearest the LRU), and the LRU. In one embodiment the LRU code is the five bit priority lock code shown in Table 2 below. A discussion of the five-bit priority lock code is found in the commonly assigned U.S. patent application Ser. No. 10/174,391, entitled "Cache Memory for Identifying Locked and Least Recently Used Storage Locations" and the disclosure is incorporated herein by reference.

code bits 150, the Old LRU Code 255, and SetLock indicator 260 to order the super-ways from the MRU to the LRU. The new LRU code 270 identifies the LRU super-way 275. The LRU logic orders the four super-ways 280 from MRU to LRU. Once the LRU super-way has been identified, a random number generator 265 generates the least significant bit (LSB) to be concatenated with the LRU super-way bits 275 to form a LRU way code 185. LRU way code 185 identifies which memory block among the eight ways will be replaced. Thus, because the algorithm first determines an LRU group and then selects a memory block for replacement within the group, the LRU is determined hierarchically. Also, note that the LRU super-way is not necessarily the super-way that contains the actual LRU memory block. For example, if a super-way 280 contains both the MRU and the LRU memory block, the super-way would be identified as the MRU super-way. Thus, the LRU algorithm is an approximate algorithm. It would be obvious to one skilled in the art that although the embodiment showed an eight-way set associative memory, the concepts can be expanded to include other numbers of groups and super-ways. For example, in another embodiment a sixteen-way set associative cache memory 105 can be comprised of four super-ways 280 of four memory blocks 107 each. A two-bit random number generator would then determine which memory block 107 within the LRU super-way would be replaced in the event of a cache miss. Also, the embodiments are not limited to groupings by numbers that are powers of two. For example, in some embodiments a six-way set associative cache memory 105 is divided into 2 or 3 super-ways 280.

FIG. 3 shows one embodiment of an eight-way set associative cache memory system 100 grouped into four super-ways 280 that uses a nine-bit LRU algorithm. The additional bits are used as a priority encoder, or Way Select bits 385, and are used to determine the final memory block to be replaced within the LRU super-way. In the embodiment, one Way Select bit 385 is assigned to each super-way 280. When the LRU super-way is determined, the state of the corresponding Way Select bit 385 will identify the LRU memory block to be replaced within the super-way 280. In a further embodiment involving only two memory groups within the super-way, the LRU memory group could be identified by inverting the least significant bit of the Hitway code bits 150.

TABLE 2

True LRU and Lock Code (LRUcode[4:0] = edcba) for 4-Way

| Condition | Lock | LRU Ordering |
|---|---|---|
| If dc ≠ ba | No Lock | dc = MRU Way, ba = LRU Way.<br>If e = 0 then MRU-1 is on the left of LRU-1 in {ba, b̄a, bā, b̄ā}<br>If e = 1 then MRU-1 is on the right of LRU-1 in {ba, b̄a, bā, b̄ā} |
| If dc = ba ≠ 00 | Way 0 Locked | 00 = MRU Way, ba = LRU Way.<br>If e = 0 then MRU-1 is on the left of LRU-1 in {ba, b̄a, bā, b̄ā}<br>If e = 1 then MRU-1 is on the right of LRU-1 in {ba, b̄a, bā, b̄ā} |
| If dc = ba = 00 | Both Way 0&1 Locked | 00 = MRU Way, 01 = MRU-1 Way.<br>If e = 0 then 11 = LRU Way, 10 = LRU-1 Way.<br>If e = 1 then 10 = LRU Way, 11 = LRU-1 Way. |

In the event of a cache miss, a new memory block of data needs to be written into the cache memory 105. Ideally the LRU memory block will be replaced. In the embodiment in FIG. 2, the eight ways are grouped into four super-ways 280 of two ways each. The LRU logic block 245 uses Hitway FIG. 4 shows one embodiment of an eight-way set associative cache memory system 100 that uses a one-bit LRU algorithm. The eight ways 120 of cache memory 105 are grouped into two super-ways 280 of four memory groups. The one-bit LRU logic 245 identifies the MRU and LRU super-ways 280. Once the LRU super-way is identified 275 a two-bit random number generator 265 determines which memory block will be replaced within the LRU super-way. Again, it is not certain that the LRU memory block is in the LRU super-way. Thus, the one-bit LRU algorithm is an approximate algorithm.

FIG. 5 shows one embodiment of an eight-way set associative cache memory system 100 that uses an eleven-bit LRU algorithm. The eight ways 120 are grouped into two super-ways 280 of four memory blocks 107 each. Way Select 385 uses Hitway code bits 150 to determine which super-way is the MRU and the LRU. The five-bit LRU logic 245 uses the Hitway code 150 and SetLock indicator 260 to order the four memory blocks 107 within each super-way 280 from the MRU to the LRU. The Way Select 385 selects which LRU code bits 275 will be concatenated with the Way Select bit 281 to form the LRU way code 185. The LRU way code 185 identifies which memory block among the eight ways 120 will be replaced. Thus, the eleven-bit LRU algorithm is a hierarchical algorithm. Again, it is not certain the LRU super-way is the super-way 280 that contains the actual LRU memory block. The super-way 280 that contains the MRU memory block may also contain the true LRU memory block. In this case the LRU memory block of the LRU super-way will be selected for replacement. Thus, the eleven-bit LRU replacement algorithm is an approximate algorithm.

The table below contains the probability of a specific way being selected for replacement for an eight-way cache memory using the indicated LRU algorithms. For example, for a one-bit LRU algorithm, the probability of the actual LRU being chosen for replacement is 14.3%. This is because there are 40,320 states possible of ordering eight ways from the MRU to the LRU (8!). Since the MRU way is known, it will never be chosen as the LRU way. The other seven ways all have an equal chance of being chosen as the LRU way. Thus, the probability is (No. of states with that way chosen as LRU)/(Total No. of states), or since each has an equal chance of being chosen, the probability is 1/7.

five-bit LRU logic will be concatenated with a "0" to form the LRU way code 185, or whether the LRU code bit from the one-bit LRU logic will be concatenated with "10" to form the LRU way code 185. The final LRU way code 185 identifies which memory block among the six ways will be replaced. Note that the number of memory blocks 107 within the super-ways 280, 681 do not need to be equal.

Table 4 shows the number of bits needed for a hierarchical approximate LRU algorithm for the general case of an N-way set associative cache grouped into M super-ways.

TABLE 4

Number of Bits Required for an N-way LRU Code.

| N | Bits necessary to encode: | | | | | |
|---|---|---|---|---|---|---|
| | super-way$_0$ | super-way$_1$ | super-way$_i$ | super-way$_{M-1}$ | M super-ways | Total |
| 8 (FIG. 2)* | 0 | 0 | 0 | 0 | 5 | 5 |
| 8 (FIG. 3) | 1 | 1 | 1 | 1 | 5 | 9 |
| 8 (FIG. 4)* | 0 | 0 | — | — | 1 | 1 |
| 8 (FIG. 5) | 5 | 5 | — | — | 1 | 11 |
| 6 (FIG. 6) | 5 | 1 | — | — | 1 | 7 |
| 16 (5-bit LRU) | 5 | 5 | 5 | 5 | 5 | 25 |
| 16 (9-bit LRU) | 9 | 9 | — | — | 1 | 19 |

*Note:
Bit Count Excludes Random Number Generator.

Let $S_0, S_1, S_i, \ldots S_{M-1}$ equal the number of memory blocks 107 in each super way 280 so that $S_0+S_1+S_i+ \ldots +S_{M-1}=N$. It is simplest and most efficient to have $S_0=S_{1=Si}= \ldots =S_{M-1}=N/M$, but it is not necessary to have it as a requirement. Then the number of bits required for the LRU code within the super-way is $\lceil \log_2(S_i!) \rceil$, and the number required to encode the M super-ways is $\lceil \log_2(M!) \rceil$.

FIG. 7 shows one embodiment of a flow chart of a method 700 of selecting a memory block to be replaced in the event of a cache miss. The method includes placing N memory blocks into M groups of N/M memory blocks 710. An LRU group is then determined from among the M groups 720. In

TABLE 3

Probability of an LRU Being Selected as the LRU.

| | Random | 8-ways into 2 Super-ways | | 8-ways into 4 Super-ways | |
|---|---|---|---|---|---|
| Way | LRU | 1-Bit LRU | 11-Bit LRU | 5-Bit LRU | 9-Bit LRU |
| MRU | 1/8 = 12.5% | 0 (never) | 0 (never) | 0 (never) | 0 (never) |
| MRU-1 | 1/8 = 12.5% | 5760/40320 = 14/3% | 0 (never) | 0 (never) | 0 (never) |
| MRU-2 | 1/8 = 12.5% | 5760/40320 = 14/3% | 0 (never) | 0 (never) | 0 (never) |
| MRU-3 | 1/8 = 12.5% | 5760/40320 = 14/3% | 0 (never) | 4608/40320 = 11.4% | 0 (never) |
| LRU-3 | 1/8 = 12.5% | 5760/40320 = 14/3% | 1152/40320 = 2.9% | 8064/40320 = 20% | 2304/40320 = 5.7% |
| LRU-2 | 1/8 = 12.5% | 5760/40320 = 14/3% | 4608/40320 = 11.4% | 9216/40320 = 22.9% | 6912/40320 = 17 1% |
| LRU-1 | 1/8 = 12.5% | 5760/40320 = 14/3% | 11520/40320 = 28.6% | 9216/40320 = 22.9% | 12672/40320 = 31 4% |
| LRU | 1/8 = 12.5% | 5760/40320 = 14/3% | 23040/40320 = 57.1% | 9216/40320 = 22.9% | 18432/40320 = 45.7% |

FIG. 6 shows one embodiment of a six-way set associative cache memory system 100 that uses a seven-bit LRU algorithm. The six ways are grouped into one super-way of four memory blocks 280 and one super-way of two memory blocks 681. The five-bit LRU logic 245 uses the Hitway code 150 and SetLock indicator 260 to order the four memory blocks 107 within four memory block super-way 280 from the MRU to the LRU. The one-bit LRU logic 646 determines which memory group is the MRU and which is the LRU within the two memory group super-way 681. Way Select 385 selects whether the LRU code bits 275 from the one embodiment, determining an LRU group of memory blocks includes ordering the M groups of memory blocks from the MRU group to the LRU group. In other embodiments ordering the groups includes a state machine tracking an order of hits and replacements to each group such that a state of the state machine corresponds to an order of hits. At step 730 a memory block is selected to be replaced within the LRU group. In one embodiment selecting a memory block to be replaced within the LRU group of memory blocks includes randomly selecting the memory block. In another embodiment, selecting a memory block to be replaced within the LRU group of memory blocks includes determining and selecting the LRU memory block.

The embodiments shown above together with the discussion of the general case illustrate some of the advantages of the hierarchical approximate LRU algorithm. For example, by re-using the five-bit LRU logic block, the hierarchical method is easily expandable to higher orders of a set associative cache. The hierarchical organization can also simplify circuit layout. For example, the five-bit LRU logic block can be efficiently laid out as a modular unit and then re-used to achieve a higher order cache memory layout. Also, the algorithm is flexible. Flexibility is advantageous when third-party memory is used. The algorithm can be adapted to use a method that will maximize performance of the third-party memory.

Although specific examples have been illustrated and described herein, it will be appreciated by those of ordinary skill in the art that any arrangement which is calculated to achieve the same purpose may be substituted for the specific example shown. This application is intended to cover any adaptations or variations of the present invention. Therefore, it is intended that this invention be limited only by the claims and the equivalents thereof.

What is claimed is:

1. A system for cache memory management, the system comprising:
    a cache memory, wherein the cache memory comprises memory blocks allocated into sets of N memory blocks, and wherein the N memory blocks are allocated as M super-ways of N/M memory blocks, wherein N is greater than M;
    an index, wherein the index identifies the set of N memory blocks;
    a super-way hit/replacement tracking state machine, wherein the super-way hit/replacement tracking state machine tracks hits and replacements to each super-way and maintains state corresponding to an order of hits and replacements to each super-way, wherein the state orders the super-ways from the MRU to the LRU;
    state bit storage associated with each index entry, wherein the state bits include code bits associated with a memory block to be replaced within a LRU super-way;
    LRU logic coupled to the super-way hit/replacement tracking state machine, wherein the LRU logic selects an LRU super-way as a function of the super-way hit and replacement history; and
    block selection logic coupled to the LRU logic, wherein the block selection logic selects a memory block to be replaced within the LRU super-way as a function of predefined selection criteria.

2. The system of claim 1, wherein the block selection logic includes a log2(N/M)-bit random number generator, and wherein the block selection logic selects a memory block to be replaced as a function of a random number generated by the random number generator.

3. The system of claim 1, wherein the block selection logic selects a memory block to be replaced as a function of an approximately randomly generated number.

4. The system of claim 1, wherein the block selection logic includes a priority encoder that uses log2(N/M) bits for each of the M super-ways to track the history of memory block replacement within each M super-way.

5. The system of claim 4, wherein tracking the history of memory block replacement within each M super-way includes recording the most recent used way within the super-way.

6. The system of claim 4, wherein the block selection logic selects the LRU memory block within the super-way for replacement.

7. The system of claim 1, wherein the block selection logic includes LRU logic to select an LRU way as a function of the way hit and replacement history within each M super-way.

8. The system of claim 1, wherein the state bits are stored in a RAM array.

9. In a cache memory having memory blocks allocated into sets of N memory blocks, a method of selecting a memory block to be replaced on a cache miss, the method comprising:
    placing the N memory blocks into M groups of N/M memory blocks, wherein N is greater than M;
    determining a least recently used (LRU) group of memory blocks; and
    selecting a memory block to be replaced within the LRU group of memory blocks, wherein selecting includes randomly selecting the memory block;
    wherein determining the LRU group of memory blocks includes ordering the M groups of memory blocks from a most recently used (MRU) group to the LRU group, wherein ordering the groups includes tracking, via a state machine, an order of hits and replacements to each group such that a state of the state machine corresponds to an order of hits.

10. In a cache memory having memory blocks allocated into sets of N memory blocks, a method of selecting a memory block to be replaced on a cache miss, the method comprising:
    placing the N memory blocks into M groups of N/M memory blocks, wherein N is greater than M;
    determining a least recently used (LRU) group of memory blocks, wherein determining the LRU group of memory blocks includes ordering the M groups of memory blocks from a most recently used (MRU) group to the LRU group, wherein ordering the groups includes tracking, via a state machine, an order of hits and replacements to each group such that a state of the state machine corresponds to an order of hits;
    determining an LRU block within the LRU group, wherein determining includes ordering memory blocks within the groups by tracking hits to memory blocks within each group; and
    selecting the LRU memory block as the memory block to be replaced within the LRU group of memory blocks.

* * * * *